United States Patent [19]
Onda et al.

[11] Patent Number: 4,505,352
[45] Date of Patent: Mar. 19, 1985

[54] SWING TYPE POWER UNIT FOR A TWO-WHEELED MOTOR VEHICLE

[75] Inventors: Takanori Onda, Saitama; Takeo Saito, Tokyo, both of Japan

[73] Assignee: Honda Giken Kogyo Kabushiki Kaisha, Tokyo, Japan

[21] Appl. No.: 455,717

[22] Filed: Jan. 5, 1983

[30] Foreign Application Priority Data

Jan. 9, 1982 [JP] Japan .................................. 57-1348

[51] Int. Cl.$^3$ .............................................. B62K 25/06
[52] U.S. Cl. ............................... 180/219; 123/179 SE
[58] Field of Search ............... 180/219, 227, 228, 229, 180/230, 231

[56] References Cited

U.S. PATENT DOCUMENTS 4,091,887  5/1978  Kurata et al. ..................... 180/219
4,339,964  7/1982  Isaka ................................... 180/219
4,364,445  12/1982  Iizuka et al. ....................... 180/230

Primary Examiner—Joseph F. Peters, Jr.
Assistant Examiner—Donn McGiehan
Attorney, Agent, or Firm—Sughrue, Mion, Zinn, Macpeak, and Seas

[57] ABSTRACT

A swing type power unit for a two-wheeled motor vehicle including a four-cycle engine. The engine has an output shaft disposed in a transmission case adjacent to its front end. The case has its rear end portion provided with a rear wheel drive shaft, and has a wet type multi-stage power transmission mechanism disposed between the output shaft of the engine and the rear wheel drive shaft. The transmission case has front end pivotally secured to a vehicle body, and has the rear end to the body through a shock absorber. Oil lubrication for the engine and the power transmission mechanism is performed by oil accumulated in and at a bottom of said transmission case.

9 Claims, 36 Drawing Figures

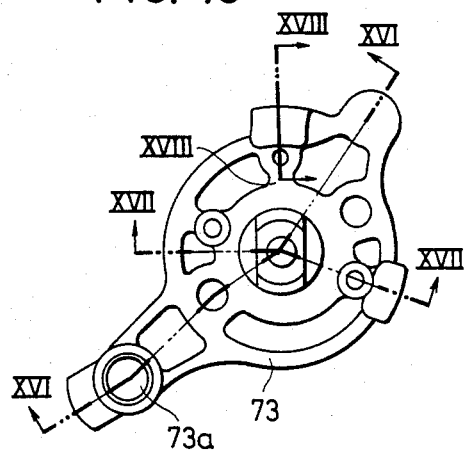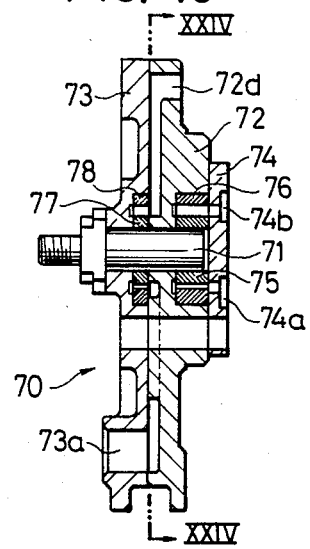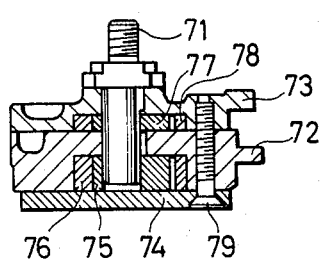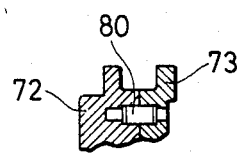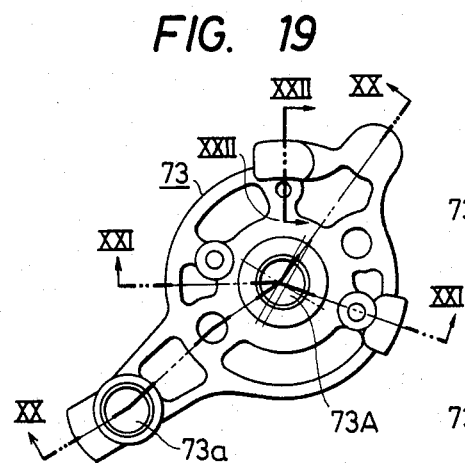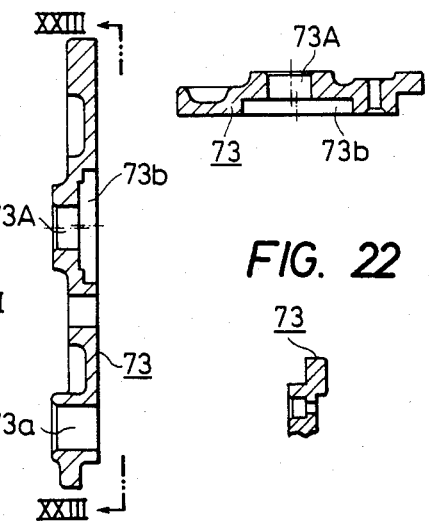

FIG. 29  FIG. 30  FIG. 31  FIG. 32
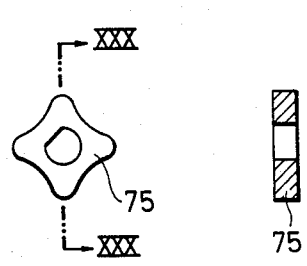 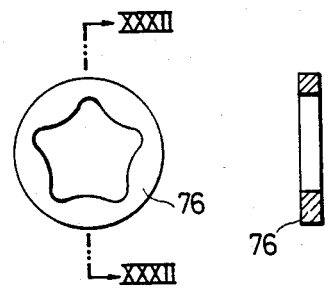
FIG. 33  FIG. 34  FIG. 35  FIG. 36
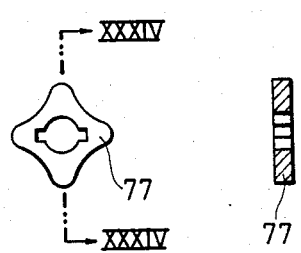 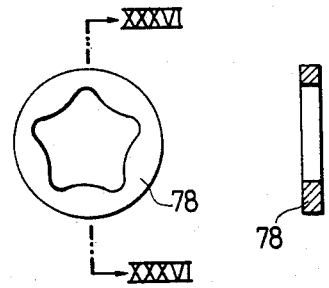

SWING TYPE POWER UNIT FOR A TWO-WHEELED MOTOR VEHICLE

BACKGROUND OF THE INVENTION

This invention relates to a swing type power unit for a two-wheeled motor vehicle having a four-cycle engine.

A swing type power unit is known for a two-wheeled motor vehicle having a two-cycle engine. The vehicle does not have a rear fork, but its rear wheel is supported directly on the power unit. No such power unit is, however, available as yet for a two-wheeled motor vehicle having a four-cycle engine, because of the difficulty involved in the location of the oil pan, since a lubricant oil pump is usually employed for the engine.

According to the swing type power unit, the engine has a center approximately coinciding with that of the vehicle body to improve the operability, stability and riding comfort of the vehicle. This arrangement, however, creates between the output of a crankshaft and a crank bearing a dead space corresponding to the gap in which the rear wheel is mounted.

Oil is usually supplied to a clutch or transmission by an oil bath for "splash lubrication", or an oil pump or the like for "forced lubrication". According to the "splash lubrication method", oil is agitated for delivery to the area to be lubricated, and the agitation of the oil gives rise to a power loss. If the depth by which the clutch or transmission is immersed in the oil is reduced to decrease such power loss, the effect of lubrication is correspondingly reduced. Therefore, it is difficult to establish an appropriate oil level which can also vary with a change in the posture of a person on the vehicle.

SUMMARY OF THE INVENTION

This invention provides a swing type power unit for a two-wheeled vehicle having a four-cycle engine. The lubricant oil used in common for the engine and the transmission is stored in the lower portion of the transmission case. The swing type power unit has an increased heat capacity, and the oil is cooled by the power unit's large surface area. Thus, the engine and the transmission release heat at an improved rate, and the vehicle is simple in construction.

The lower portion of the transmission case defines an oil storage compartment which extends longitudinally of the vehicle and projects downwardly. The storage compartment is provided with an outlet leading to an oil pan approximately in the center of the case longitudinally of the vehicle, so that the lubricant oil may always be supplied to the oil pump with a high degree of stability irrespective of the orientation of the power unit when the vehicle is in normal operation.

According to another aspect of this invention, the dead space is effectively utilized for accommodating a driven gear for a starter-motor and a one-way clutch therein. Therefore, it is possible to position the starter adjacent to the transverse center of the vehicle. The operability, stability and riding comfort of the vehicle are improved, and the power unit as a whole is compact in construction.

According to still another aspect of this invention, there is provided a forced lubrication swing type power unit for a two-wheeled motor vehicle having a four-cycle engine. It is intended to simplifying the construction of the vehicle, reduce its weight, decrease the power loss caused by the agitation of lubricant oil, and positioning the various parts correctly in the transmission case. The lubricant oil used in common for the engine and the transmission is stored in the lower portion of the transmission case, and an oil pump which is driven by the engine power is installed in the transmission case. A dividing wall is provided for surrounding a high-speed clutch disposed in that portion of the case which faces a drive shaft for the rear wheel, and the oil pump has a suction port formed in the dividing wall. This arrangement lubricates the clutch or the transmission effectively. Lubricant oil is eliminated from the dividing wall, and the power loss arising from the agitation of the lubricant oil by the high-speed clutch is reduced very effectively. Moreover, the operation of the clutch is stabilized, and the construction of the vehicle is simplified.

BRIEF DESCRIPTION OF THE DRAWINGS

In the drawings,

FIG. 15 is a side elevational view of the oil pump;

FIG. 16 is a sectional view taken along the line XVI—XVI of FIG. 15;

FIG. 17 is a sectional view taken along the line XVII—XVII of FIG. 15;

FIG. 18 is a sectional view taken along the line XVIII—XVIII of FIG. 15;

FIG. 19 is a side elevational view of an oil pump cover;

FIG. 20 is a sectional view taken along the line XX—XX of FIG. 19;

FIG. 21 is a sectional view taken along the line XXI—XXI of FIG. 19;

FIG. 22 is a sectional view taken along the line XXII—XXII of FIG. 19;

FIGS. 29 to 36 are views illustrating various rotors for the oil pump.

DETAILED DESCRIPTION OF THE PREFERRED EMBODIMENTS

Figure 1:
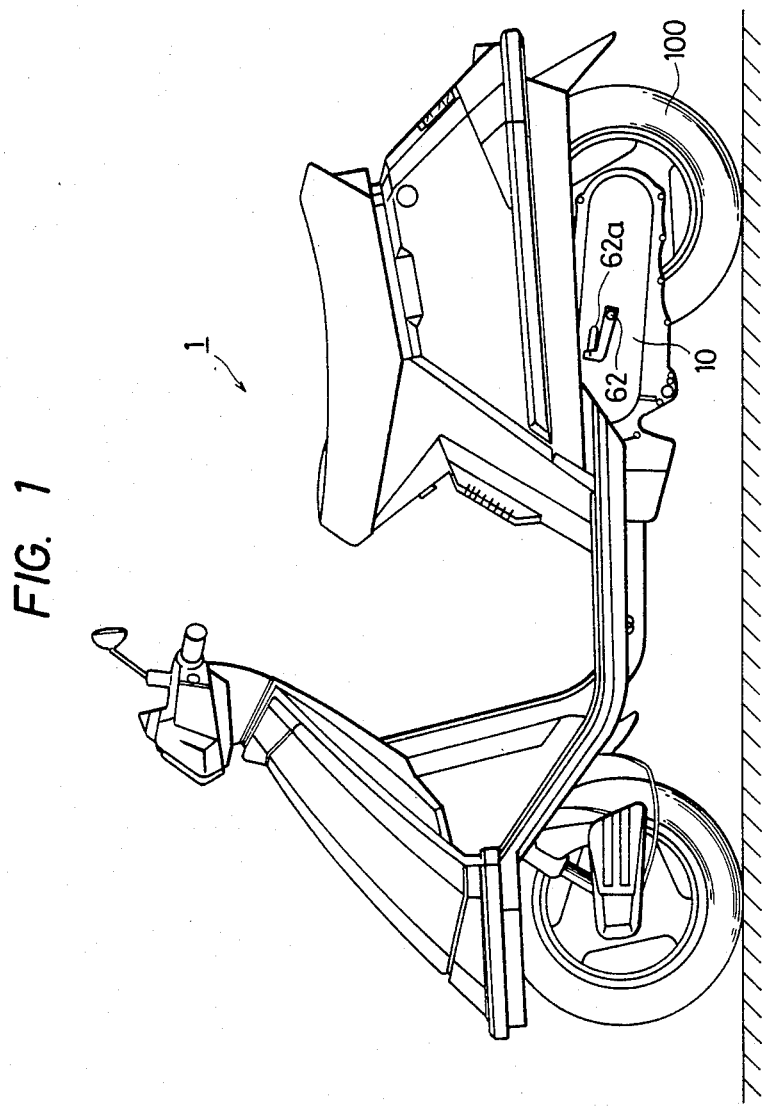
FIG. 1 is a left side elevational view of a two-wheeled motor vehicle having a swing type power unit embodying this invention.
Figure 2:
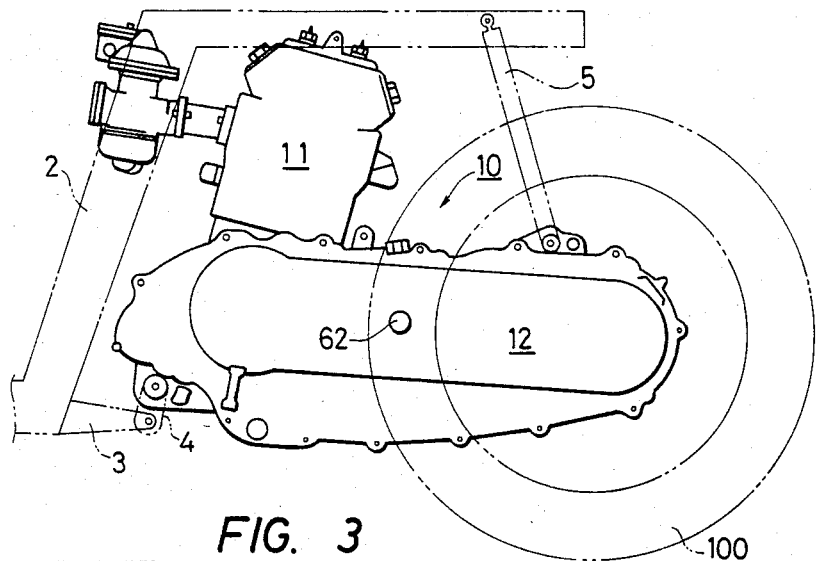
FIG. 2 is a left side elevational view of the power unit.
Figure 3:
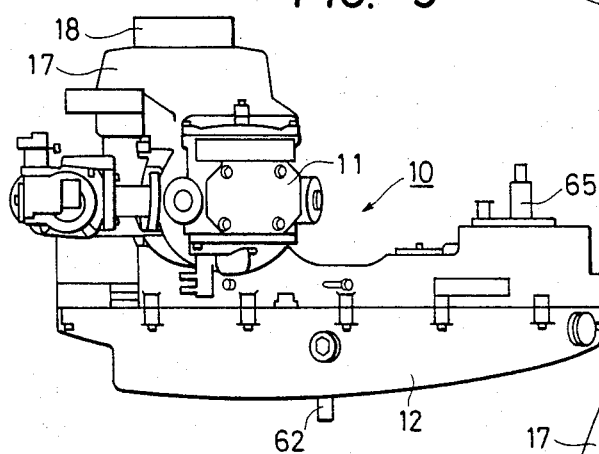
FIG. 3 is a top plan view of the power unit.

In a two-wheeled motor vehicle 1 of the type known as a scooter, a power unit 10 comprises an integral assembly of an air-cooled four-cycle engine 11 having a single vertical cylinder, and a transmission case 12. The power unit 10 has a front end rotatably supported by a link 4 on the free end of a hanger bracket 3 attached to a body frame 2, while adjacent to its rear end, the power unit 10 is supported by a rear cushion 5 on the body frame 2, as shown in FIGS. 1 and 2.

Figure 4:
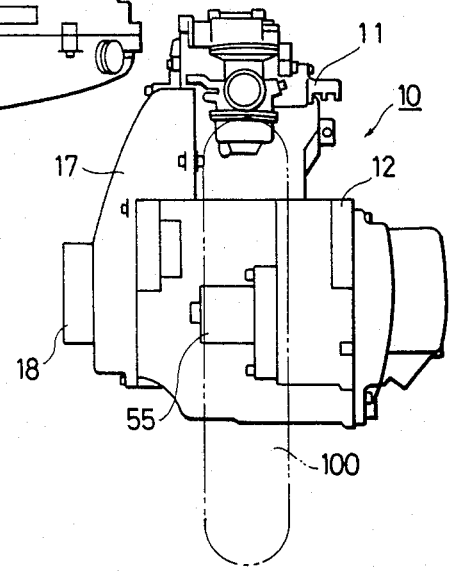
FIG. 4 is a view looking toward the back of the unit of FIG. 2.
Figure 6:
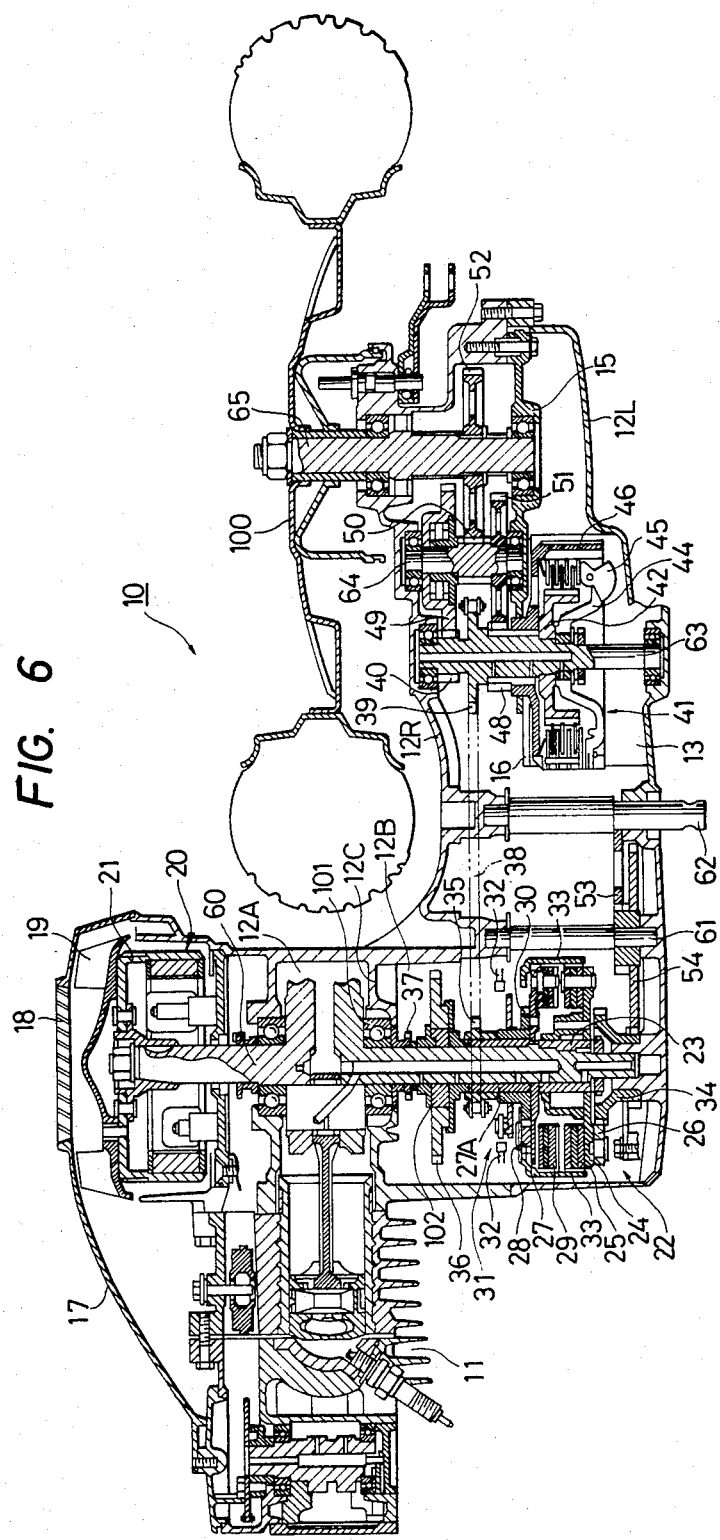
FIG. 6 is a sectional view taken along the line VI—VI of FIG. 5.

The power unit 10 serves as a rear fork substitute. The transmission case 12 is provided adjacent to its rear end with a rear wheel driving shaft 65 on which a rear wheel 100 is cantilevered (FIGS. 3, 4, 6 and 7). The transmission case 12 is generally L-shaped in top plan so that the engine may have a center aligned with that of the tire (FIGS. 4 and 6).

The transmission case 12 has a crank chamber and a transmission chamber which are connected with each other. The transmission case 12 is widened at its front end, and has a crankshaft supporting wall 12c on which a crankshaft 60 is rotatably supported by a crank bearing 101. The crankshaft 60, an idle shaft 61, a kick shaft 62, a main shaft 63 and the rear wheel driving shaft 65 are juxtaposed to one another between the opposite ends of the transmission case 12, and lie in the same horizontal plane H. An intermediate shaft 64 is located somewhat below the horizontal plane H between the main shaft 63 and the rear wheel driving shaft 65. See FIG. 6.

The case 12 has a bottom wall which extends longitudinally of the vehicle and projects downwardly to define a lubricant oil storage compartment, or an oil pan. The oil pan stores lubricant oil up to a standard oil level L (FIG. 5) when the engine is in operation.

A rotor 21 of an AC generator 20 and an engine cooling fan 19 connected integrally to the rotor 21 are rotatably connected to one end of the crankshaft 60. This area is covered by a shroud 17 having an air inlet 18. An automatic centrifugal starting clutch 22 is disposed on the other end of the crankshaft 60. The clutch 22 comprises a first rotary plate 24 integrated with a collar 23 splined to the crankshaft 60, a first weight 25 attached to the rotary plate 24, a second rotary plate 27 integrated with a collar 27a splined to a drive sprocket 35, a plurality of planetary gears 28 and a second weight 29 supported rotatably on the rotary plate 27, a sun gear 30 provided with a one-way clutch mechanism 31 (including a pawl 32 attached to the transmission case 12, a ring gear 33 encircling the first and second weights 25 and 29 and meshing with the planetary gears 28, a ratchet gear 34 attached to the first rotary plate 24 and disposed about the end of the crankshaft 60, and a pawl 26 defining a one-way clutch mechanism 102. The crankshaft 60 further carries thereon the drive sprocket 35 adjacent to the clutch 22, a starter-motor driven gear 36, and an oil pump drive sprocket 37.

Figure 5:
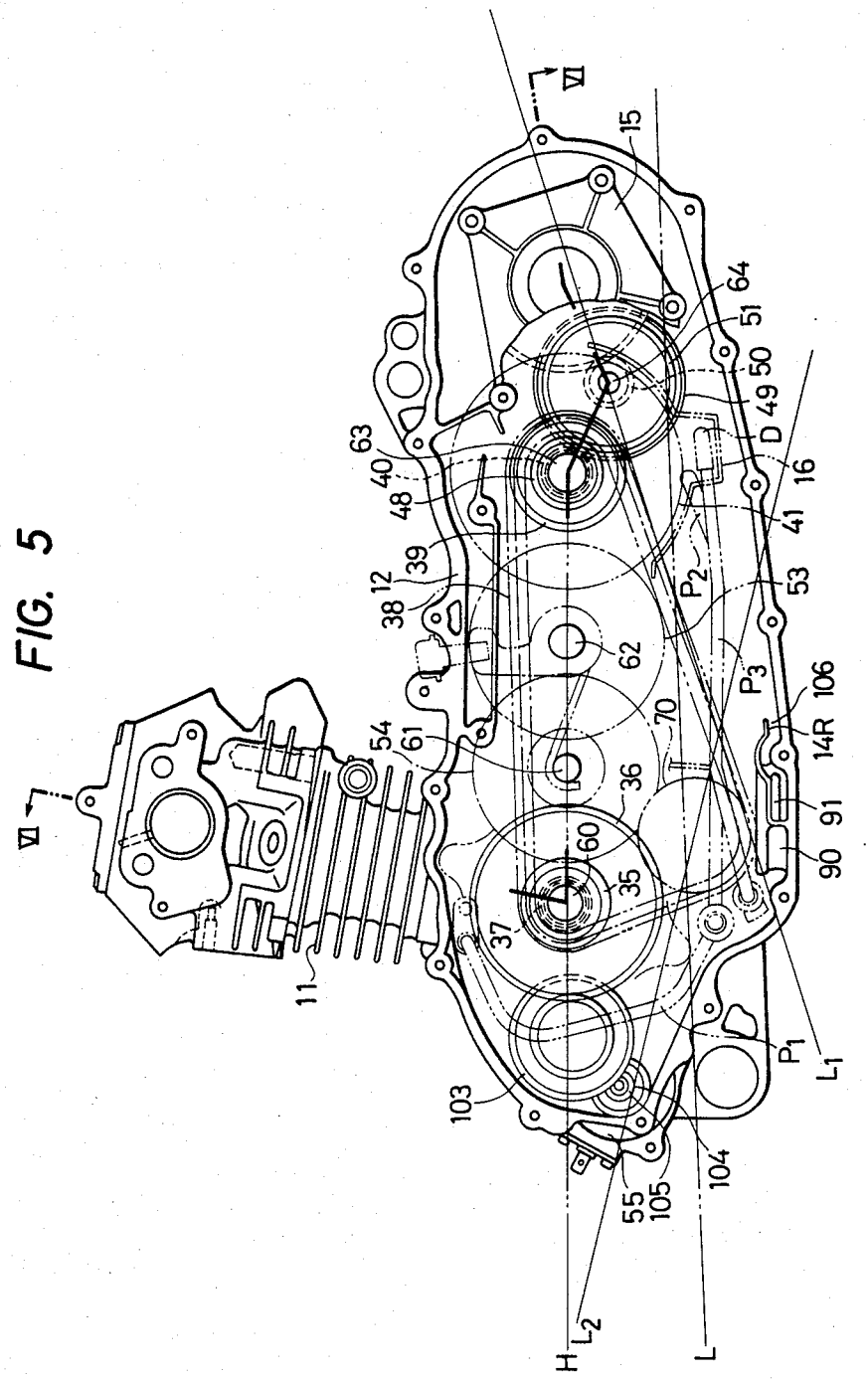
FIG. 5 is a side elevational view, partly in section, of the power unit.

The crankshaft 60 is elongated, since the center of the engine is aligned with that of the tire, i.e., the center of the vehicle, and since the rear wheel 100 is supported on one end of the rear wheel driving shaft 65. Accordingly, a free space is available between the supporting wall 12c and the centrifugal clutch 22 or the drive sprocket 35. This space is utilized for accommodating the starter-motor driven gear 36 which is supported by the one-way clutch 102 on the crankshaft 60. The driven gear 36 is connected with a pinion 105 on a starter-motor shaft 104 by a starter-motor reduction gear 103 disposed at the front end of the transmission case 12 (FIG. 5). The starter-motor 55 is located approximately in the transverse center of the vehicle at the front end of the transmission case 12 (FIG. 4).

Figure 7:
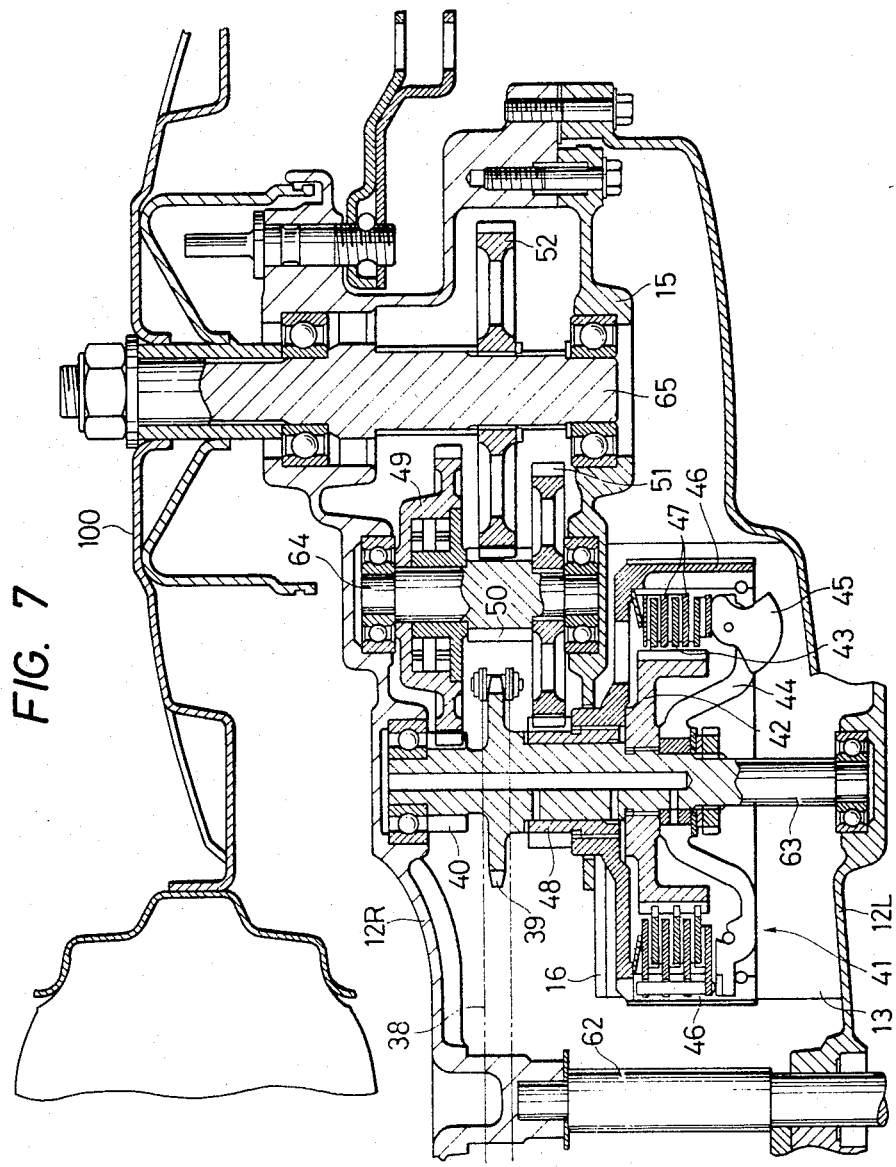
FIG. 7 is a fragmentary enlarged view of FIG. 6.

A centrifugal top clutch 41 of the wet multi-plate type, a top gear 48, a driven sprocket 39 and a one-two-speed gear 49 are disposed or formed integrally on the main shaft 63 (FIG. 6). The top clutch 41 comprises a clutch center 42 splined to the main shaft 63, a top drive plate 44 supported rotatably on the main shaft 63, a drive weight 45 supported rotatably on the drive plate 44, a clutch outer member 46 spined to an extension of the top gear 48, and a clutch disk 43 and a clutch plate 47 which are engaged with the clutch center 42 and the clutch outer member 46, respectively, as shown in FIG. 7.

The gear 49, which is provided with a one-way clutch, the top gear 48 and a gear 50 are disposed or formed integrally on the intermediate shaft 64. A final driven gear 52 is provided on the rear wheel driving shaft 65 on which the rear wheel 100 is rotatably supported. A sector gear 53 is provided on the kick shaft 62, and an idle gear 54 on the idle shaft 61. The rotation of the kick shaft 62 is transmitted through the gears 53 and 54 to the ratchet gear 34.

An oil strainer 90 is provided at the bottom of the bearing holder wall 12c dividing the crank and transmission chambers at the front end of the oil pan. It has suction ports connected with the crank and transmission chambers. The suction port 106 facing the transmission chamber is situated approximately in the center of the oil pan longitudinally of the vehicle. An oil pump 70 is located immediately above the oil strainer 90, and driven by the drive sprocket 37. The lubricant oil stored in the oil pan is drawn through the oil strainer 90 into the oil pump 70, and delivered through oil pipes $P_1$ and $P_2$ to the cylinder head and the transmission.

Figure 8:
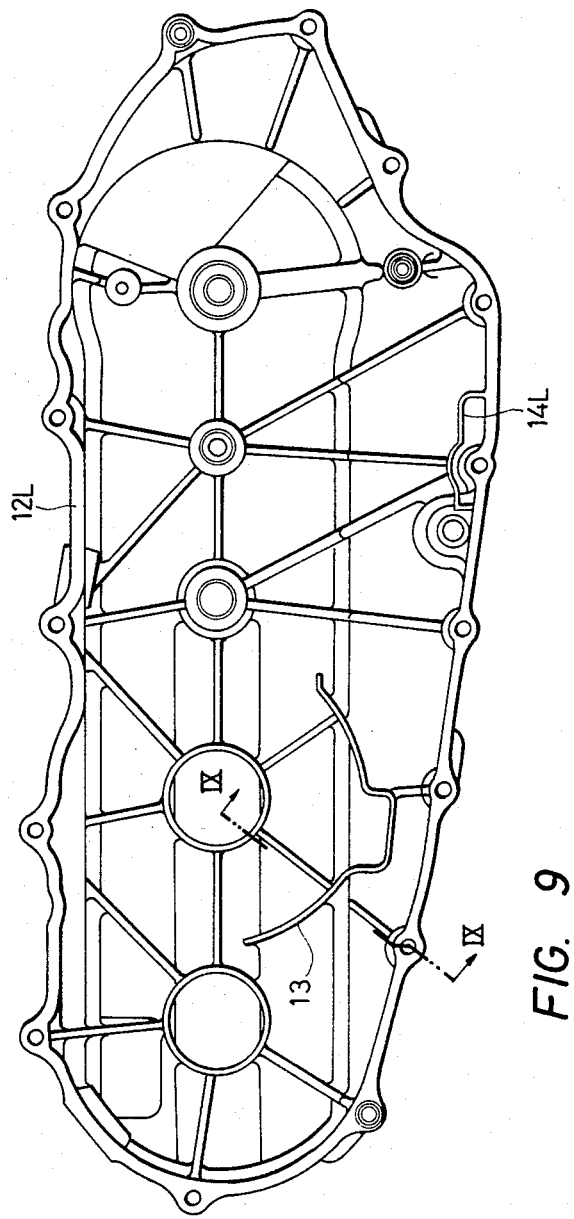
FIG. 8 is an inner side elevational view of the left transmission case.
Figure 9:
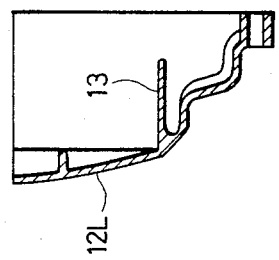
FIG. 9 is a sectional view taken along the line IX—IX of FIG. 8.
Figure 10:
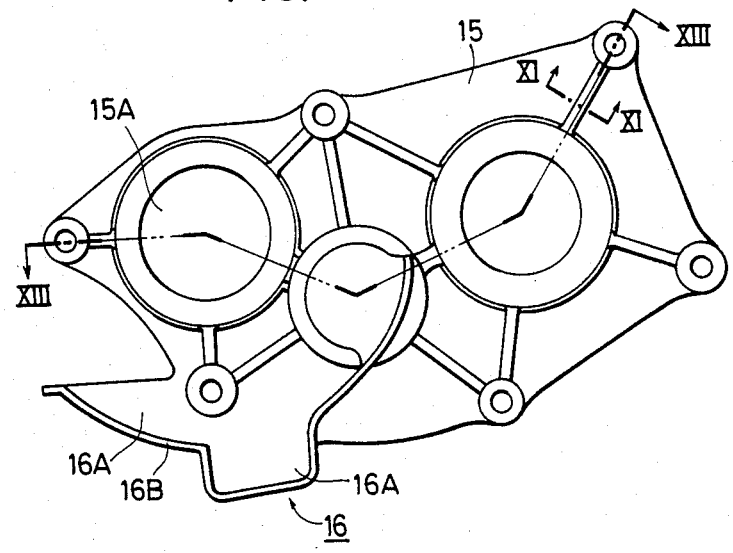
FIG. 10 is a left side elevational view of a holder bracket.
Figure 11:
FIG. 11 is a sectional view taken along the line XI—XI of FIG. 10.
Figure 12:
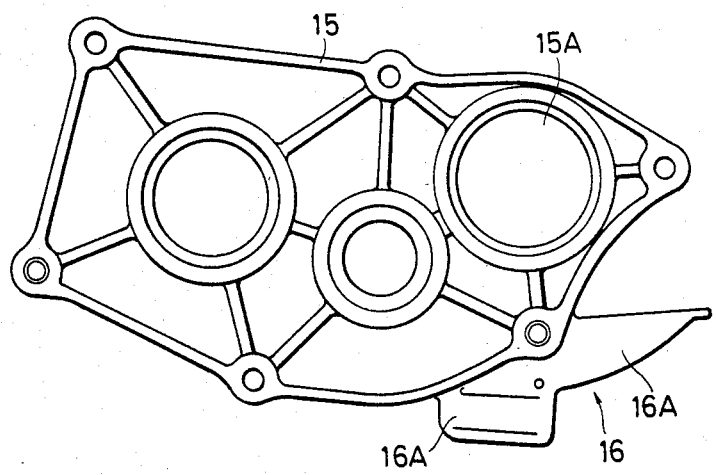
FIG. 12 is a right side elevational view of the holder bracket.
Figure 13:
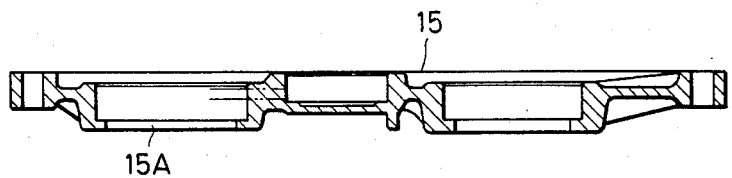
FIG. 13 is a sectional view taken along the line XIII—XIII of FIG. 10.

The transmission case 12 is formed by right and left case sections 12R and 12L. A holder bracket 15 (FIGS. 10 to 13) is threadedly connected (FIGS. 5 and 7) to the right case section 12R at the joint between the right and left sections 12R and 12L at the rear end of the case 12. The intermediate shaft 64 and the rear wheel drive shaft 65 are supported rotatably on the right case section 12R and the bracket 15. The main shaft 63 extends through an opening 15A. The holder bracket 15 has a wall extension 16A which projects toward the front end of the vehicle, and downwardly. A rib 16B projects from the bracket 15 and its extension 16A toward the left case section 12L. The greater part of the rib 16B encircles the opening 15A. The extension 16A and the rib 16B define a right dividing wall 16. A left dividing wall 13 (FIGS. 8 and 9) projects in a similar contour from the left case section 12L. Rubber packing is disposed in intimate contact with the opposite ends of the dividing walls 13 and 16. The walls 13 and 16 surround the lower portion of the clutch 41 and define a clutch chamber.

The walls 13 and 16 define the oil pan in the longitudinal center of the vehicle. They have a generally cup-shaped cross section having a rear portion which rises more sharply than its front portion.

Figure 14:
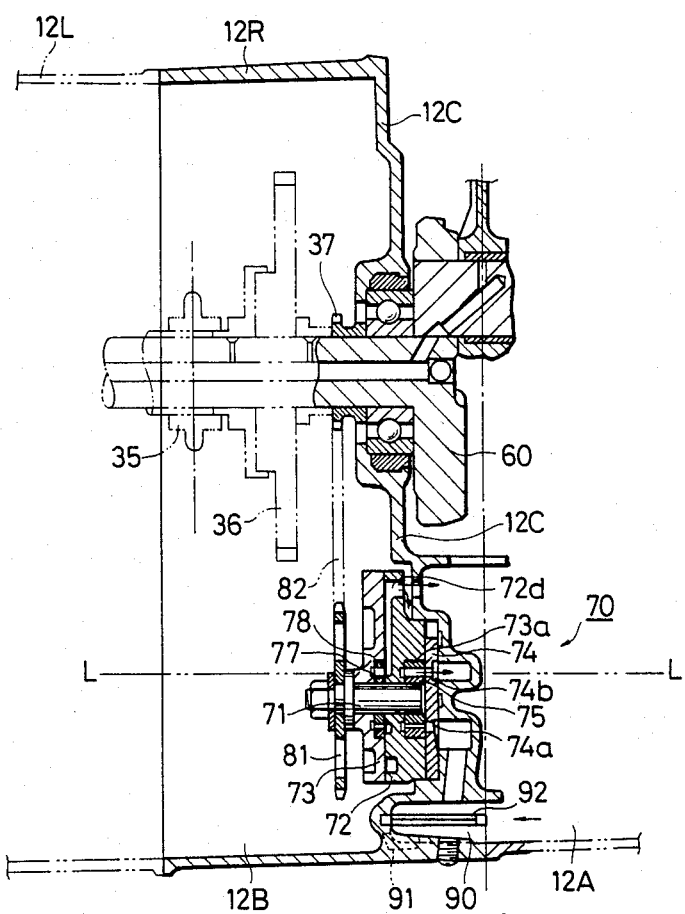
FIG. 14 is a fragmentary view illustrating the mounting of an oil pump.
Figure 23:
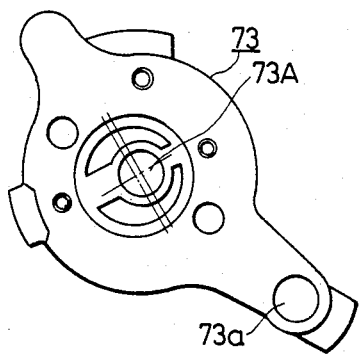
FIG. 23 is a view taken along the line XXIII—XXIII of FIG. 20.
Figure 24:
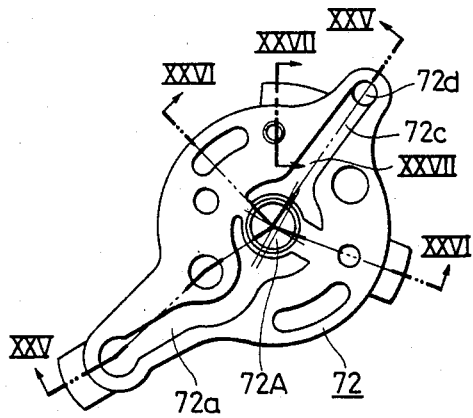
FIG. 24 is a side elevational view of the oil pump body taken along the line XXIV—XXIV of FIG. 16.
Figure 25:
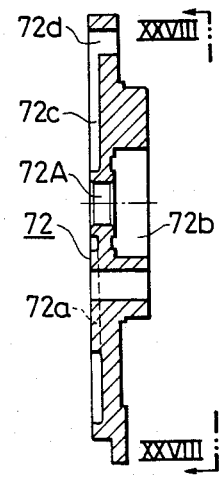
FIG. 25 is a sectional view taken along the line XXV—XXV of FIG. 24.
Figure 26:
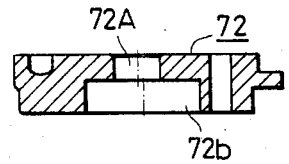
FIG. 26 is a sectional view taken along the line XXVI—XXVI of FIG. 24.
Figure 27:
FIG. 27 is a sectional view taken along the line XXVII—XXVII of FIG. 24.
Figure 28:
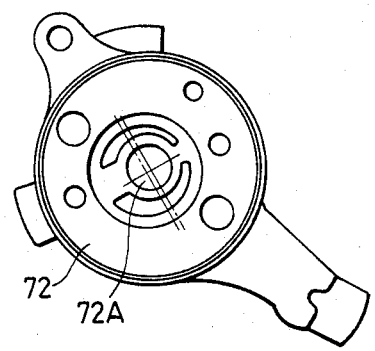
FIG. 28 is a view taken along the line XXVIII—XXVIII of FIG. 25.

The starter-motor 55 is disposed at the front end of the transmission case 12 as shown in FIGS. 4 and 5. The duplex oil pump (trochoid pump) 70 is mounted below the wall 12c dividing the crank and transmission chambers 12A and 12B, as shown in FIG. 14. The pump 70 includes a pump body 72 and a cover 73 which are positioned relative to each other by a pin 80. The pump body 72, the cover 73 and a plate 74 are integrally joined together by a screw 79. The pump body 72 has a first rotor chamber 72b in which a first outer rotor 76 and a first inner rotor 75 are disposed. The cover 73 defines a second rotor chamber 73b in which a second outer rotor 78 and a second inner rotor 77 are disposed. The inner rotors 75 and 77 are fitted about a driving shaft 71 received rotatably in the axial holes 72A and 73A of the pump body 72 and the cover 73, respectively (FIGS. 14 to 18). The rotors are not rotatable independently of the driving shaft 71. A driven sprocket 81 for the oil pump is rotatably supported on the driving shaft 71, and a chain 82 extends between the oil pump drive sprocket 37 and the driven sprocket 81. The pump 70 has a first inlet 74a through which lubricant oil is drawn from the crank and transmission chambers 12A and 12B, a first outlet 74b through which oil is delivered to the cylinder head and the crankshaft 60 and the main shaft 63, a second inlet 73a through which oil is drawn from the clutch chamber and a second outlet 72d which opens above the standard oil level L.

The pump body 72 has an inlet passage 72a, an outlet passage 72c and the second outlet 72d, while the cover 73 has the second inlet 73a, and the plate 74 has the first inlet 74a and the first outlet 74b, as shown in FIGS. 19 to 28. Thus, the pump body 72, the plate 74, the first inner rotor 75 and the first outer rotor 76 define a first oil pump for lubricating the engine and the transmission, while the cover 73, the pump body 72, the third inner rotor 77 and the second outer rotor 78 define a second oil pump for collecting oil from the crank chamber. The shapes of the rotors 75 to 78 are shown by way of example in FIGS. 29 to 36.

The oil pipes $P_1$ and $P_2$ are connected to the first outlet 74b. A suction pipe $P_3$ is connected to the second inlet 73a, and has an inlet D disposed in the oil pan defined by the dividing walls 13 and 16. The first inlet 74a is connected to the oil strainer 90 having an oil screen 92. The strainer 90 has a hole 91 through which the crank and transmission chambers 12A and 12B are connected to each other. The right and left case sections 12R and 12L are formed at the very bottom thereof with dividing walls 14R and 14L, respectively, for oil. They define the oil pan, and a space communicating with the hole 91. Thus, the bottom portion of the transmission case 12 defines the oil pan in which lubricant oil is stored up to the standard oil level L, as shown in FIG. 5.

In the apparatus hereinabove described with reference to FIGS. 1 to 36, the engine 11 is started by the starter-motor 55 or a kick pedal 62a. In the event the kick pedal 62a is used, the rotation of the kick shaft 62 is transmitted to the ratchet gear 34 through the sector gear 53 on the kick shaft 62 and the idle gear 54 on the idle shaft 61. The rotation is, then, transmitted to the crankshaft 60 through the pawl 26 defining the ratchet mechanism with the gear 34, the first rotary plate 24 supporting the pawl 26, and the collar 23 integrated with the rotary plate 24, as shown in FIG. 6. The clutch 22 remains disengaged until the crankshaft 60 begins to rotate at a predetermined speed; therefore, the driving force of the engine 11 is not transmitted to the rear wheel 100. If the rotating speed of the engine is increased to a predetermined extent, the first weight 25, which is attached to the first rotary plate 24 rotating with the crankshaft 60, is swung outwardly by centrifugal force into abutment on the inner wall surface of the ring gear 33. The first weight 25 and the ring gear 33 rotate together, and the rotation of the ring gear 33 is transmitted to the planetary gears 28.

The planetary gears 28 rotate about their own axis and about the sun gear 30. The sun gear 30 stands at rest, since its rotation following the rotation of the planetary gears 28 about their own axis is hindered by the one-way clutch mechanism 31 including the pawl 32 on the transmission case 12. As the planetary gears 28 rotate about the sun gear 30, the second rotary plate 27 supporting the gears 28 is rotated, and the drive sprocket 35 is rotated by the collar 27a which is integral with the rotary plate 27. This is a first stage of speed reduction.

If the rotating speed of the engine is further increased to a predetermined level, the second weight 29, which is supported on the second rotary plate 27, is swung outwardly into abutment on the inner wall surface of the ring gear 33. As the planetary gears 28 are integral with the ring gear 33, they no longer rotate about their own axes, but only rotate about the sun gear 30. As the sun gear 30 is freely rotatable in the direction in which the planetary gears rotate about the sun gear, the gears 33, 28 and 30 rotate together, and their torque is transmitted to the drive sprocket 35. This is a second stage of speed reduction.

After these two stages of speed reduction, the rotation of the crankshaft 60 is transmitted to the driven sprocket 39 through the drive sprocket 35 and the primary chain 38 to rotate the main shaft 63. This rotation is transmitted through the gears 40 and 49 to the intermediate shaft 64 to rotate it at a speed below a predetermined level. The rotation is, then, transmitted through the gear 50 and the final driven gear 52 to rotate the rear wheel driving shaft 65.

If the engine speed is further increased to a level in excess of the predetermined level, the drive weights 45, which are attached to the top drive plate 44 of the clutch 41 rotating with the main shaft 63, are centrifugally swung, and the clutch disk 43 and the clutch plate 47 are forced into contact with each other. Thus, the rotation of the clutch center 42, which rotates with the main shaft 63, is transmitted to the clutch outer member 46 through the disk 43 and the plate 47, so that torque may be transmitted to the top gear 48 splined to the outer member 46. This torque is transmitted from the top gear 48 to the top gear 51, which is integral with the intermediate shaft 64, and transmitted to the rear wheel driving shaft 65 through the gear 50 and the final driven gear 52. When the top clutch 41 is engaged, the intermediate shaft 64 rotates at a higher speed, but the gear 49 does not transmit any torque, since the one-way clutch is provided between the gear 49 and the intermediate shaft 64.

Upon rotation of the crankshaft 60, the drive sprocket 37 for the oil pump, the chain 84 and the driven sprocket 83 for the oil pump are rotated to operate the oil pump 70. The pump 70 is of the duplex type. In the first pump defined by the pump body 72 for lubrication, the lubricant oil stored in the lower portions of the crank and transmission chambers 12A and 12B is drawn through the oil strainer 90 into the first inlet 74a, and delivered through the first outlet 74b and the oil pipes $P_1$ and $P_2$ to the cylinder head and the relevant shafts. The oil flowing through the oil pipe $P_2$ is supplied to the bearings for the main shaft 63 on the right case section 12R. This oil is forced through the oil strainer into the oil passage formed axially in the main shaft 63. The lubricant oil is forced out through the openings in the boss of the top drive plate 44, and delivered by the centrifugal force created by the rotation of the clutch 41 to the running part of the clutch disk 43 to lubricate and cool it. This oil is also scattered centrifugally through the opening in the clutch outer member 46, and is caused to flow along the inner wall surfaces of the dividing walls 13 and 16 to be stored in the oil pan.

The oil in the oil pan is drawn into the second pump defined by the cover 73 through the pipe $P_3$ and the second inlet 73a of the pump 70, and is discharged into the oil pan at the bottom of the transmission case 12 through the second outlet 72d located above the oil level L. The second pump is capable of discharging a larger quantity of oil than is supplied through the oil passage in the main shaft 63 into the top clutch chamber defined by the dividing walls 13 and 16. Therefore, the top clutch chamber is always empty of lubricant oil. Moreover, the walls 13 and are so high as not to allow any oil to flow into the clutch chamber even if there occurs a change in the level of oil in the oil pan upon acceleration or deceleration of the vehicle, or when the vehicle is running on a slope. In FIG. 5, $L_1$ indicates an oil level which may appear when the vehicle is running on an upward slope, while $L_2$ shows an oil level which may appear when the vehicle is on a downward slope. This feature, and the capacity of the second pump effectively prevent any agitation of the oil by the top clutch 41, and thereby any resulting power loss of the engine.

If there were no such clutch chamber, and the top clutch 41 were immersed in the oil in the oil pan, a given output of the vehicle would require a greater force due to the shearing resistance created by the movement of the clutch outer member 42 and the drive weight 45 through the oil if there were any difference in the speed of rotation between the clutch outer member 42 and the drive weight 45. This tendency would be worsened by an increase in speed reduction between the clutch 41 and the rear wheel driving shaft 65, and by an increase in the viscosity of the oil at low temperatures.

According to this invention, only a small force is required to run the vehicle, since the clutch 41 is not immersed in oil. This is also true when the engine is restarted, since no oil enters the clutch chamber after the engine has been stopped.

In an ordinary wet multi-plate clutch, the quantity of oil supplied to the frictionally contacting surfaces of the clutch disk and the clutch plate exerts a great influence on the variable speed characteristics of the clutch. According to this invention, a constant supply of oil is ensured, and the clutch always almost completely exhibits the initially designed variable speed characteristics, since it is only through the oil passage in the main shaft 63 that oil is supplied into the clutch chamber.

The speed of rotation is reduced by a specific ratio between the crankshaft and the main shaft 63, i.e., between the drive sprocket 35 and the driven sprocket 39. Since an increased torque has to be transmitted in accordance with the reduction ratio, it is necessary to employ a relatively large clutch 41, and the agitation of the oil by such a clutch gives rise to a considerably large power loss. This power loss results in a large difference in the torque at the rear wheel driving shaft 65 if a high ratio speed reduction is effected between the clutch 41 and the shaft 65. According to this invention, all of these problems are overcome very effectively, so that the engine may exhibit its full performance.

Although the dividing walls 13 and 16 have been described as being provided between the holder bracket 15 and the left section 12L of the transmission case, it is, of course, possible to dispose them in any other appropriate location, depending on the position of the automatic centrifugal top clutch 41.

The apparatus of this invention as hereinabove described has a number of advantages.

As the transmission case is used as a rear fork substitute, the vehicle body is considerably elongated, and the transmission case accommodates the centrifugal clutch and the top clutch therein and is, therefore, large in width. Accordingly, the transmission case has an increased heat capacity and surface area. This feature, and the circulation of lubricant oil in common for the engine and the transmission ensure very effective cooling of the lubricant oil. Since lubricant oil is used in common by circulation for the engine and the transmission, the transmission is quickly warmed to enable satisfactory operation of the clutch at a low temperature, and running the vehicle with a small force.

The transmission case defines at its bottom an oil pan capable of holding a large quantity of oil, but which is not so deep as to be likely to cause deterioration of the oil, since the case occupies a considerably large space both longitudinally and transversely of the vehicle. Since a large oil pan is achieved without any substantial increase in the height of the transmission case, a sufficiently large height (e.g. ground clearance) can be ensured below the case when the vehicle runs on the ground.

In a four-cycle engine, a certain crank chamber volume is usually ensured to reduce the pumping loss of the piston. According to this invention, this volume is achieved by the transmission chamber, since it communicates with the crank chamber to enable the common use of oil for the two chambers in the power unit of this invention. Therefore, the crank chamber per se can be small in volume, so that the power unit may be reduced in weight, and the height of the installation above the ground maintained. The communication of the two chambers provides a number of other advantages, too. No sealing is required between the two chambers, and the apparatus is simple in construction. Although two breathers have hitherto been required, it is sufficient to use only one breather according to this invention. This assists in a reduction in the weight of the power unit and its cost of manufacture.

The power unit of this invention is fairly elongated longitudinally of the vehicle, since the conventional rear fork has been omitted, and the transmission case is used as a substitute therefor. The oil pan is, therefore, provided with an inlet approximately in the longitudinally middle portion of the vehicle, so that a stable supply of oil may be maintained from the oil pan to the oil pump even when the vehicle is accelerated or decelerated, or running on an upward or downward slope.

Since the crank chamber is large in width, the wall supporting the crankshaft serves as an oil separator which minimizes any unbalance of oil quantity between the lateral ends of the crank chamber to continue a constant supply of oil to the oil pump even if the vehicle is laterally inclined. As the crank and transmission chambers are communicated with each other at the bottom of the oil pan, the oil has an equal level in the two chambers, and only a single oil strainer is required. The oil pan is defined by a downward bottom wall extension of the transmission case, and this extension provides an ample space in which the oil pump is installed.

According to this invention, the conventional rear fork has been omitted, and yet, the engine is so positioned that its center may be aligned with the center of the tires, and hence the longitudinal centerline of the vehicle. A free space is, therefore, available between the crank bearing and the centrifugal clutch or drive sprocket for power transmission. This space is utilized for accommodating the one-way clutch or the driven gear for the starter-motor, so that the power unit as a whole may be compact in construction. This arrangement also enables the installation of heavy parts, such as the starter-motor, the reduction gear therefor, the one-way clutch and the driven gear for the starter-motor, approximately in the transversely middle portion of the vehicle, and thereby, the improved operability, stability and riding comfort of the vehicle. Since the starter-motor is positioned approximately in the center of the vehicle, no special protector is necessarily required therefor, and the body frame can be used to cover the motor. Although a swing type power unit is usually likely to move largely relative to the body frame, the arrangement of this invention facilitates its protection.

Although the invention has been described as being applied to a power unit including a four-cycle engine, this invention is equally applicable to a power unit having a two-cycle engine.

The oil-shielding wall surrounding the bottom of the automatic centrifugal top clutch not only prevents the agitation of lubricant oil, but also stabilizes the operation of the clutch to thereby enable it to exhibit its full performance.

The oil strainer draws oil effectively, since it is located in the passage between the crank and transmission chambers immediately below the oil pump. No separate oil strainer is required for each of the two chambers.

The dividing wall between the crank and transmission chambers serves as an oil separator which minimizes the movement of oil between the two chambers to thereby stabilize the level of oil in each chamber.

Although a swing type power unit in which the engine is longitudinally aligned with the tires creates a dead space between the dividing wall and the transmission, this invention effectively utilizes this space for the installation of the oil pump.

The use of the separate oil pipes facilitates the provision of oil passages and contributes to reducing the weight of the transmission case, as opposed to oil passages formed in the wall of the case.

As is obvious from the foregoing description, the swing type power unit of this invention simplifies the construction of the vehicle, and the dead space is effectively utilized for accommodating the oil pump for the lubrication of the engine and the transmission in a location below the crankshaft and between the centers of the engine and the transmission. The inlet of the oil pump is positioned in the passage between the crank and transmission chambers, so that it may draw oil efficiently and work with a high degree of stability. In addition to this pump, the second pump is provided in juxtaposed relation thereto to remove oil from the crank chamber to prevent any agitation of oil and reduce any resulting power loss to enable satisfactory operation of the clutch even at a low temperature and easy running of the vehicle.

What is claimed is:

1. In a swing type power unit for a two-wheeled motor vehicle including a four-cycle engine, the improvement wherein said engine has an output shaft disposed in a transmission case adjacent to its front end, a starting clutch provided on said output shaft, a shaft for driving a rear wheel being disposed in said transmission case adjacent to its rear end, a high-speed clutch being provided on said driving shaft, a wet type multi-stage power transmission mechanism being provided between said output shaft and said driving shaft, said case being rotatably connected at its front end to a vehicle body frame, said case being connected adjacent to its rear end to said frame by a shock absorber, the same oil being used in common for lubricating said engine and said transmission, said oil being stored in an oil pan defined by a bottom wall of said case and extending substantially longitudinally of the entire power unit.

2. A swing type power unit according to claim 1, wherein said bottom wall of said transmission case projects downwardly and longitudinally of said vehicle to define a relatively wide, shallow oil storage compartment, and wherein an oil pump has an inlet disposed in said compartment approximately in the longitudinally middle portion of said vehicle.

3. A swing type power unit according to claim 1, wherein a clutch is provided at one end of said output shaft, said power transmission mechanism being closer to the transverse center of said vehicle than said clutch is.

4. A swing type power unit according to claim 1, wherein said engine is longitudinally aligned with said vehicle body.

5. A swing type power unit according to claim 4, further comprising a driven gear supported by a one-way clutch on said output shaft between the center of said engine and said power transmission mechanism, said driven gear being connected to a starter-motor.

6. A swing type power unit according to claim 1, further comprising a dividing wall surrounding the lower portion of said high-speed clutch.

7. A swing type power unit according to claim 6, further comprising an oil pump disposed in said transmission case and adapted to be driven by the power of said engine, said pump having an inlet disposed within said dividing wall.

8. A swing type power unit according to claim 7, wherein said oil pump is disposed below a clutch shaft and between the centers of said engine and said power transmission mechanism, said inlet of said pump being positioned in a passage connecting a crank chamber and a transmission chamber.

9. A swing type power unit according to claim 8, further comprising a second oil pump provided in a clutch chamber in juxtaposed relation to said first mentioned oil pump for discharging oil from said clutch chamber, said second oil pump having an inlet disposed within said dividing wall, and an outlet disposed above the level of said oil stored in said transmission case.

* * * * *